US008268232B2

(12) United States Patent  
Kim et al.

(10) Patent No.: US 8,268,232 B2  
(45) Date of Patent: Sep. 18, 2012

(54) DISSOLUTION APPARATUS FOR NOBLE METALS

(75) Inventors: Min Seuk Kim, Daejeon (KR); Jong Gwan Ahn, Daejeon (KR)

(73) Assignee: Korea Institute of Geoscience and Mineral Resources (KIGAM), Daejeon (KR)

( * ) Notice: Subject to any disclaimer, the term of this patent is extended or adjusted under 35 U.S.C. 154(b) by 323 days.

(21) Appl. No.: 12/489,857

(22) Filed: Jun. 23, 2009

(65) Prior Publication Data

US 2009/0315232 A1 Dec. 24, 2009

(30) Foreign Application Priority Data

Jun. 24, 2008 (KR) .................. 10-2008-0059588

(51) Int. Cl.  
*C22B 11/00* (2006.01)

(52) U.S. Cl. ........................... 266/168; 204/146

(58) Field of Classification Search ............. 266/168; 204/146  
See application file for complete search history.

(56) References Cited

U.S. PATENT DOCUMENTS 4,052,287 A * 10/1977 Westerlund .................. 204/237  
4,775,452 A * 10/1988 Kuninaga et al. ............ 205/348

FOREIGN PATENT DOCUMENTS

| KR | 10-2006-0062666 A | 6/2006 |
| KR | 10-2006-0104091 A | 10/2006 |
| KR | 10-2007-0071174 A | 7/2007 |

* cited by examiner

*Primary Examiner* — Scott Kastler  
(74) *Attorney, Agent, or Firm* — The Webb Law Firm

(57) ABSTRACT

Provided is an apparatus for dissolving noble metals. A pH adjusting unit controls pH of liquid inside a dissolution reactor in such a manner that a chlorine compound is produced. The noble metal in a noble metal-containing sample introduced into the dissolution reactor is dissolved by the chlorine compound, and the liquid evaporated from an inorganic material extraction unit is recycled to the dissolution reactor.

4 Claims, 1 Drawing Sheet

DISSOLUTION APPARATUS FOR NOBLE METALS

The present invention claims priority to Korean Patent Application No. 10-2008-0059588, filed on 24 Jun. 2008, which is incorporated herein by reference.

BACKGROUND OF THE INVENTION

1. Field of the Invention

The present invention relates to an apparatus for dissolving noble metals, wherein chlorine gas ($Cl_2$) produced electrochemically is converted into an adequate chlorine compound depending on the particular types of noble metals so that the noble metals are dissolved effectively, and materials for use in dissolving the noble metals form a closed system.

2. Description of Related Art

In general, noble metals having high redox potentials react with a high concentration of oxidative acid, such as aqua regia, at high temperature and are dissolved therein. In this case, a large amount of acid is required due to the continuous consumption of acid. Further, treatment of the waste liquids and harmful gases generated during the reaction may entail environmental problems.

In addition, existing chlorine-based dissolution processes for dissolving platinum metals, such as rhodium or ruthenium, which may not be dissolved in aqua regia include injecting chlorine gas stored in a high-pressure gas container into a reactor. Thus, since the gaseous chlorine should be treated in the exterior of the reactor, the overall system becomes complicated and may cause safety-related problems.

To solve the above-mentioned problems, we have filed three patent applications, the disclosures of which relate to an electroleaching system for producing chlorine gas via the electrochemical oxidation of a chloride-containing solution, leaching a noble metal by the chlorine gas, and recovering the noble metal by reducing the leached noble metal in a reduction chamber using a separation membrane; an electroleaching system including a separation/purification unit by which only the noble metal is separated and purified, and then transferred to the reduction chamber; and an electroleaching system in which production of chlorine gas and leaching and reduction of the noble metal are carried out in a single unit divided by a membrane (Korean Patent Publication Nos. 1006613060000, 1007535870000 and 1006839610000). However, it is difficult to recover volatile noble metals using the known apparatuses. Under these circumstances, it is required to dissolve noble metals by introducing the most adequate chlorine compound to a noble metal depending on the particular type of the noble metal so as to improve the dissolution rate of noble metals and thus the recovery of dissolved noble metals. In addition, there is a need for developing an eco-friendly, safe and economical apparatus for dissolving noble metals, which generates no waste liquids or waste gases and forms a closed system.

SUMMARY OF THE INVENTION

Provided is a safe and economical apparatus for dissolving noble metals, which dissolves a noble metal effectively by producing/providing a specific chlorine compound (oxidizing agent) from chlorine gas ($Cl_2$) produced via electrolysis, depending on the particular type of the noble metal to be dissolved; enables recovery of volatile noble metals; generates no waste liquids and waste gases, and thus is eco-friendly; and allows recycling of a chlorine source, water and a pH adjusting agent for use in producing a noble metal solution.

In one aspect, there is provided an apparatus for dissolving noble metals, including: a sealed dissolution reactor 110 provided with agitators 111 and 112; a sealed electrolysis type chlorine producing unit 120 for supplying chlorine gas ($Cl_2$) produced via electrolysis to the dissolution reactor 110; a pH adjusting unit 130 for controlling and maintaining pH of the liquid inside the dissolution reactor 110 to convert the chlorine gas ($Cl_2$) supplied to the dissolution reactor 110 into a chlorine compound; and an inorganic material extraction unit 140 for extracting inorganic materials from the liquid received from the dissolution reactor 110 via heating/evaporation, wherein the pH adjusting unit 130 controls pH of the liquid inside the dissolution reactor 110 in such a manner that the chlorine compound is produced, the noble metal in a noble metal containing sample introduced into the dissolution reactor 110 is dissolved by the chlorine compound, and the liquid evaporated from the inorganic material extraction unit 140 is recycled to the dissolution reactor 110.

The apparatus for dissolving noble metals according to one embodiment of the present invention dissolves noble metals, such as Au, Pt, Pd, Ru, Os or a combination thereof. Particularly, the apparatus enables effective preparation of solutions of platinum metals, preparation of solutions of volatile noble metals, and preparation of an individual noble metal solution from a mixture of nonvolatile noble metals with volatile noble metals.

The chlorine compound is at least one chlorine compound(s) selected from a group consisting of $Cl_2(aq)$, $Cl_3^-$, HClO, $ClO^-$, NaClO, KClO and LiClO. Depending on pH of the liquid inside the dissolution reactor 110 controlled by the pH adjusting unit, a specific chlorine compound is produced.

The pH adjusting unit 130 is provided with pure water, alkali metal hydroxide, halide salt, acid or a combination thereof, and controls pH of the liquid inside the dissolution reactor 110 using the same.

After a noble metal-containing sample, pure water, acid or a combination thereof is introduced into the dissolution reactor 110, pH of the liquid inside the dissolution reactor 110 may be controlled by the pH adjusting unit 130. Otherwise, after only the metal-containing sample is introduced into the dissolution reactor 110, supply and pH of the liquid may be controlled by the pure water, alkali metal hydroxide, halide salt, acid or a combination thereof derived from the pH adjusting unit 130. The noble metal-containing sample may include a noble metal ore, noble metal-containing waste part, noble metal-containing composite or pure noble metal.

The noble metal to be dissolved may be Au, Pd, Pt, Ru, Os or a combination thereof. The chlorine gas supplied to the dissolution reactor 110 is converted by the pH adjusting unit 130 into an adequate chlorine compound (oxidizing agent) capable of providing a high noble metal dissolution rate, depending on the characteristics of the noble metal to be dissolved. More particularly, the chlorine gas is converted into at least one chlorine compound(s) selected from a group consisting of $Cl_2(aq)$, $Cl_3^-$, HClO, $ClO^-$, NaClO, KClO and LiClO by controlling pH as described above. Herein, a specific chlorine compound becomes a main product depending on the pH range controlled in this manner. However, other types of chlorine compounds may also be produced but in small amounts.

According to one example embodiment, the noble metal may be Au. In this case, the liquid inside the dissolution reactor 110 may be controlled to and maintained at pH 3 or lower, specifically pH −1 to pH 1, by the pH adjusting unit 130.

According to another example embodiment, the noble metal may be Pt or Pd. In this case, the liquid inside the dissolution reactor 110 may be controlled to and maintained at pH 4 or lower, specifically pH −4 to pH 2, and more specifically pH −1 to pH 1, by the pH adjusting unit 130.

According to still another example embodiment, the noble metal may be Ru or Os. In this case, the liquid inside the dissolution reactor 110 may be controlled to and maintained at pH 1 or higher, specifically pH 1 to pH 14, and more specifically pH 3 to pH 14, by the pH adjusting unit 130.

Since pH of the liquid inside the dissolution reactor is controlled to a different range for effective dissolution, depending on the particular type of the noble metal to be dissolved, the apparatus for dissolving noble metals disclosed herein enables preparation of individual noble metal solutions from a mixture of different noble metals.

The electrolysis type chlorine producing unit 120 includes an electrolyte having a Cl-containing acid or alkali metal chloride, and an anode 123 and a cathode 122 separated from each other by an ion exchange membrane 121, wherein the chlorine gas ($Cl_2$) produced at the anode 123 is supplied to the dissolution reactor 110. In addition, hydrogen gas ($H_2$) generated at the cathode 122 is supplied as a heat source for the heater 141 for heating the inorganic material extraction unit 140. The Cl-containing acid may be hydrochloric acid (HCl).

When the electrolyte includes an alkali metal chloride, an alkali metal hydroxide is produced together with hydrogen at the cathode 122 through the counter-reaction to the chlorine production. The alkali metal hydroxide is supplied to the pH adjusting unit 130. Therefore, the pH adjusting unit 130 controls the acidity of the liquid inside the dissolution reactor 110 using the alkali metal hydroxide produced at the cathode 122.

The alkali metal chloride may include NaCl, KCl, LiCl or a mixture thereof. The alkali metal hydroxide may include NaOH, KOH, LiOH or a mixture thereof. Particularly, the alkali metal chloride may be NaCl. In this case, NaOH may be produced at the cathode 122 during the counter-reaction.

As described above, after the noble metal present in the metal-containing sample introduced into the dissolution reactor 110 is dissolved by the chlorine compound, the resultant noble metal solution moves from the dissolution reactor 110 to the inorganic material extraction unit 140 and is heated/evaporated by the heater 141 for heating the inorganic material extraction unit 140. At that time, the noble metal contained in the noble metal solution remains in the form of a noble metal compound, while the materials, such as pure water and acid, introduced by the pH adjusting unit 130 are evaporated. The liquid evaporated from the inorganic material extraction unit 140 is reintroduced into the dissolution reactor 110 and is reutilized for dissolving the noble metal. In this manner, it is possible to substantially minimize discharge of waste water and waste liquids. It is also possible to minimize introduction of materials for pH adjustment from the pH adjusting unit 130 to the dissolution reactor 110.

When the noble metal is a volatile noble metal (Ru or Os), the apparatus for dissolving noble metals may further include a volatile noble metal collecting unit 150 for collecting and reducing the noble metal oxide ($RuO_4$ or $OsO_4$) evaporated from the dissolution reactor 110.

The volatile noble metal collecting unit 150 reduces the noble metal using a currently used reducing agent for reducing the evaporated noble metal component or a high-concentration strong acid solution containing an alcohol, so that the noble metal is separated and recovered.

The apparatus for dissolving noble metals disclosed herein may further include an exhaust gas treating unit 160 for removing chlorine and chlorine compounds from the exhaust gas in order to prevent emission of the non-dissolved chlorine gas or the remaining chlorine compound in the dissolution reactor, which, otherwise, would be emitted to the exterior.

More particularly, non-dissolved chlorine gas or chlorine compound may remain in the dissolution reactor 110 even after dissolving a noble metal with an excessive amount of chlorine compound produced as described above. To prevent the chlorine compound from being emitted to the exterior through the volatile noble metal collecting unit 150, dissolution reactor 110 or inorganic material extraction unit 140, the apparatus for dissolving novel metals may further include an exhaust gas treating unit 160, which removes the chlorine compound contained in the exhaust gas discharged from the volatile noble metal collecting unit 150. The exhaust gas treating unit 160 is for use in preventing emission of non-reacted chlorine compound (oxidizing agent) or chlorine gas. The exhaust gas treating unit may remove the chlorine compound using a KI solution or a mixed solution of inexpensive non-noble metals capable of reducing the chlorine compound into chloride ions.

As described above, when the noble metal is a volatile noble metal (Ru or Os), the liquid inside the dissolution reactor 110 is controlled to and maintained at pH 1 or higher, specifically pH 1 to pH 14, by the pH adjusting unit 130. To accomplish this, the electrolyte may include an alkali metal chloride, an alkali metal hydroxide produced at the cathode 122 as the counter-reaction to the chlorine production may be supplied to the pH adjusting unit 130, and acidity of the liquid inside the dissolution reactor 110 may be controlled and maintained using the alkali metal hydroxide supplied from the electrolysis type chlorine producing unit 120. Herein, the volatile noble metal is reduced and recovered at the volatile noble metal collecting unit 150. The inorganic material extracted from the inorganic material extraction unit 140 is alkali metal chloride produced via the neutralization of the alkali metal hydroxide introduced for controlling and maintaining pH with the acid of the solution present inside the dissolution reactor 110. In addition, the extracted alkali metal chloride is supplied to the electrolysis type chlorine producing unit 120 as an electrolyte.

In this manner, the alkali metal chloride extracted from the inorganic material extraction unit 140 is reintroduced into the electrolysis type chlorine producing unit 120 of the apparatus for dissolving novel metals so that it may be reutilized as a starting material for producing chlorine gas ($Cl_2$). Therefore, the apparatus for dissolving noble metals disclosed herein emits no waste liquids or waste gases and requires no introduction of a material from which chlorine gas is produced, thereby forming a substantially closed system.

Additionally, in order to perform effective dissolution and evaporation of the noble metal, the apparatus for dissolving novel metals may further include a heating unit installed on the outer wall of the dissolution reactor 110 to control the temperature thereof.

Further, the apparatus for dissolving novel metals may further include a pH sensor in the dissolution reactor 110 for detecting pH of the liquid inside the dissolution reactor in order to control and maintain pH precisely.

DETAILED DESCRIPTION OF MAIN ELEMENTS

Figure 1:
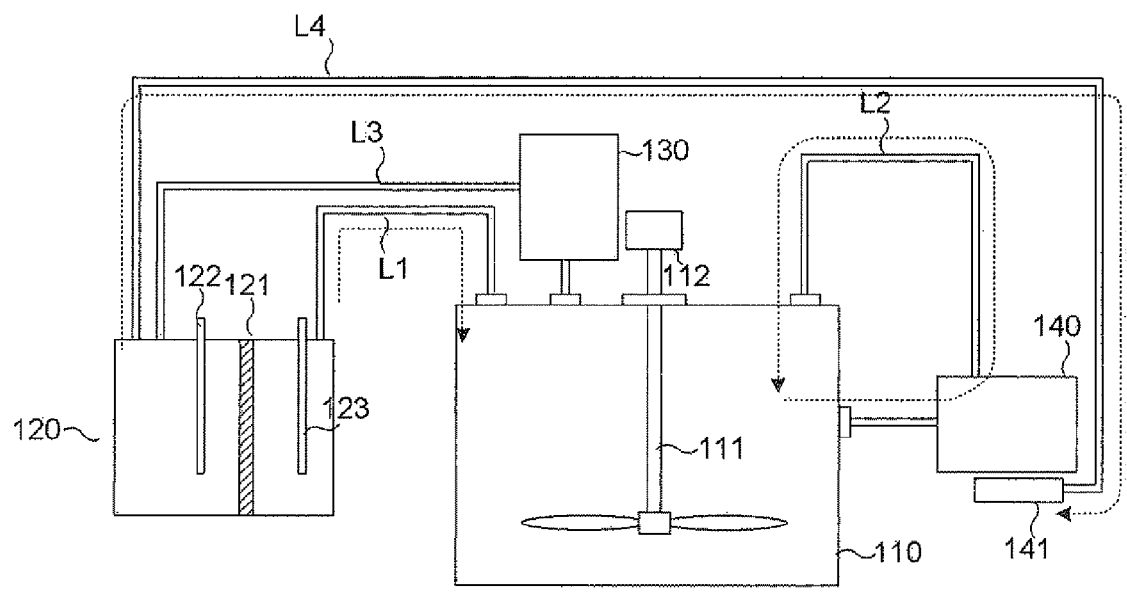
FIG. 1 is a schematic view showing the apparatus for dissolving noble metals in accordance with one embodiment of the present invention.

110: Dissolution reactor
120: Electrolysis type chlorine producing unit
130: pH adjusting unit
140: Inorganic material extraction unit
141: Heater
150: Volatile noble metal collecting unit
160: Exhaust gas treating unit

DESCRIPTION OF SPECIFIC EMBODIMENTS

Exemplary embodiments now will be described more fully hereinafter with reference to the accompanying drawings, in which exemplary embodiments are shown. Rather, these exemplary embodiments are provided so that this disclosure will be thorough and complete, and will fully convey the scope of this disclosure to those skilled in the art. This disclosure may, however, be embodied in many different forms and should not be construed as limited to the exemplary embodiments set forth therein.

Unless otherwise defined, all terms (including technical and scientific terms) used herein have the same meaning as commonly understood by one of ordinary skill in the art. In the description, details of well-known features and techniques may be omitted to avoid unnecessarily obscuring the presented embodiments.

FIG. 1 is a schematic view showing the apparatus for dissolving noble metals according to one embodiment. The apparatus as shown in FIG. 1 includes: a sealed dissolution reactor 110 provided with agitators 111 and 112; a sealed electrolysis type chlorine producing unit 120 for supplying chlorine gas ($Cl_2$) produced via electrolysis to the dissolution reactor 110; a pH adjusting unit 130 for controlling and maintaining pH of the liquid inside the dissolution reactor 110 to convert the chlorine gas ($Cl_2$) supplied to the dissolution reactor 110 into a chlorine compound; and an inorganic material extraction unit 140 for extracting inorganic materials from the liquid received from the dissolution reactor 110 via heating/evaporation.

To the dissolution reactor 110, a noble metal-containing sample may be introduced through an inlet (not shown). The supply and pH of the liquid inside the dissolution reactor 110 may be controlled by pure water, alkali metal hydroxide, halide salt, acid or a combination thereof in the pH adjusting unit 130. The liquid for dissolving the noble metal inside the dissolution reactor 110 may be an acidic solution introduced from pure water and the acid, a halide solution introduced from pure water and the halide salt, or pure water alone. However, the liquid for dissolving the noble metal inside the dissolution reactor 110 may also be introduced along with the noble metal-containing sample through the inlet (not shown), wherein the pH adjusting unit 130 serves to control the liquid introduced into the dissolution reactor 110 to an adequate pH range. Additionally, the pH adjusting unit 130 serves to maintain pH of the solution that may be varied during the dissolution of the noble metal.

The liquid and the noble metal-containing sample in the dissolution reactor 110 are agitated by blades 111 and a motor 112 forming the agitators 111 and 112. Although it is not shown in FIG. 1, in order to perform effective dissolution of a novel metal and effective evaporation of a volatile noble metal, the apparatus for dissolving novel metals may further include a heating unit installed on the outer wall of the dissolution reactor 110 to control the temperature thereof. Besides the heating unit, the apparatus for dissolving novel metals may further include a pH sensor in the dissolution reactor 110 for detecting pH of the liquid inside the dissolution reactor 110 in order to control and maintain pH precisely.

The electrolysis type chlorine producing unit 120 produces an adequate amount of chlorine gas ($Cl_2$) via electrolysis based on the particular type of the noble metal-containing sample and the noble metal content, and supplies the chlorine gas to the dissolution reactor 110. The electrolysis type chlorine producing unit 120 includes an electrolyte containing chloride ions, particularly an electrolyte including a Cl-containing acid or alkali metal chloride, and an anode 123 and a cathode 122 separated/isolated by an ion exchange membrane 121. The chlorine gas ($Cl_2$) produced at the anode 123 by an oxidation current is supplied to the dissolution reactor 110 through a chlorine supply line L1. Herein, one end of the chlorine supply line L1 linked to the dissolution reactor 110 may be dipped into the liquid present in the dissolution reactor 110, and the dipped end may be provided with a diffuser (not shown) to maximize the conversion into the chlorine compound.

The anode 123 may include a non-dissoluble conductive material that is stable against electrochemical reaction, for example, graphite that is stable against a chlorine oxidizing agent. The cathode 122 may include a non-dissoluble conductive material that is stable against the electrolyte, for example, stainless steel, titanium or graphite. The ion exchange membrane 121 may be a cation exchange membrane. Detailed descriptions of the electrolysis type chlorine producing unit 120 may be found in Korean Patent Publication Nos. 1006613060000, 1007535870000 and 1006839610000.

When an acid (Cl-containing acid) or alkali metal chloride is used to provide chloride ions to the electrolyte, hydrogen gas is generated at the cathode 122 as the counter reaction. The hydrogen gas generated at the cathode 122 is supplied to the heater 141 for heating the inorganic material extraction unit 140 through a hydrogen gas supply line L4 so that it may be used as an energy source (e.g. supplementary heating source) for the heater.

Particularly, when an alkali metal chloride is used in the electrolyte, an alkali metal hydroxide is produced at the cathode 122. The alkali metal hydroxide (NaOH solution) produced at the cathode 122 is supplied to the pH adjusting unit 130 through a base supply line L3 so that it may be used for controlling the acidity of the liquid inside the dissolution reactor 110.

The pH adjusting unit 130 controls pH of the liquid inside the dissolution reactor 110 so that the chlorine gas supplied from the electrolysis type chlorine producing unit 120 to the dissolution reactor 110 may be converted into a specific chlorine compound. The chlorine gas is converted into a specific compound depending on pH of the liquid controlled by the pH adjusting unit 130. Particularly, the chlorine gas may be converted into a chlorine compound that allows effective dissolution of a noble metal, depending on physical properties of the noble metal-containing sample and the particular type of the noble metal to be dissolved.

In the dissolution reactor 110, the chlorine gas is converted into at least one chlorine compound(s) selected from a group consisting of $Cl_2(aq)$, $Cl_3^-$, HClO, $ClO^-$, NaClO, KClO and LiClO by the pH adjusting unit 130.

When the liquid inside the dissolution reactor 110 is controlled to and maintained at pH −1 to pH 1 by the pH adjusting unit 130, the chlorine gas is converted into $Cl_2$(aq), $Cl_3^-$ or a combined oxidizing agent thereof (chlorine compound). Under these conditions, Au may be dissolved as an Au-chlorine complex, if Au is the noble metal to be dissolved.

When the liquid inside the dissolution reactor 110 is controlled to and maintained at pH −4 to pH 2 by the pH adjusting unit 130, the chlorine gas is converted into $Cl_2$(aq), $Cl_3^-$, HClO or a combined oxidizing agent thereof (chlorine compound). Under these conditions, Pt or Pd may be dissolved, if Pt or Pd is the noble metal to be dissolved. More particularly, the liquid inside the dissolution reactor 110 may be controlled to and maintained at pH −1 to pH 1. Such conditions enable Pt or Pd to be dissolved as a Pt-chlorine or Pd-chlorine complex in the presence of the specific oxidizing agent as described above.

When the liquid inside the dissolution reactor 110 is controlled to and maintained at pH 1 or higher, particularly pH 1 to pH 14, and more particularly pH 3 to pH 14 by the pH adjusting unit 130, the chlorine gas is converted into HClO, NaClO, KClO, LiClO, OCl−, or a combined oxidizing agent thereof (chlorine compound). Under these conditions, Ru or Os may be dissolved as a Ru oxide or Os oxide, if Ru or Os is the noble metal to be dissolved. Controlling/maintaining pH of the liquid inside the dissolution reactor 110 to/at pH 1 or higher may be performed by the alkali metal hydroxide of the pH adjusting unit 130. The alkali metal hydroxide of the pH adjusting unit 130 may be produced at and supplied from the electrolysis type chlorine producing unit 120.

As mentioned above, the noble metal contained in the noble metal-containing sample is dissolved in the form of a chlorine complex or oxide thereof, in the presence of a specific oxidizing agent capable of effective dissolution of a noble metal depending on the particular type of the noble metal to be dissolved.

The apparatus disclosed herein produces a specific chlorine compound capable of effective dissolution of a specific noble metal using the pH adjusting unit 130. Therefore, it is possible to dissolve a specific noble metal selectively from a mixed noble metal sample containing different noble metals. In addition, after the selective dissolution of one noble metal, the noble metal is extracted in the form of a noble metal compound (solid phase) from the resultant noble metal solution through the inorganic material extraction unit 140, while the liquid evaporated during the extraction is reintroduced into the dissolution reactor 110, and then pH of the liquid inside the dissolution reactor 110 is controlled again to dissolve another noble metal contained in the mixed noble metal sample. By repeating this, different noble metals may be dissolved sequentially and selectively from a sample containing different kinds of noble metals.

After the chlorine compound is produced by controlling the acidity of the liquid inside the dissolution reactor 110, the chlorine compound causes dissolution of the noble metal in the noble metal-containing sample to produce a noble metal solution. The chloride compound used for the dissolution of the noble metal is reduced back into chloride ions.

Although it is not shown in the figures, both electrodes 122 and 123 of the electrolysis type chlorine producing unit 120 may be connected to a power source for supplying electric power to the electrodes. The pH adjusting unit 130 may be provided with a valve to control the amount of materials introduced for controlling pH. In addition, the apparatus may further include a pump for transferring the liquid in the dissolution reactor 110 to the inorganic material extraction unit 140 after the dissolution of the noble metal.

When the noble metal to be dissolved is non-volatile, the resultant noble metal-chlorine complex is heated at the inorganic material extraction unit 140 and extracted as solid. At that time, the liquid (pure water, acid) components evaporated from the inorganic material extraction unit 140 are reintroduced into the dissolution reactor 110 through a liquid reintroduction line L2. When the noble metal to be dissolved is volatile, the apparatus may be designed on the basis of the schematic view of FIG. 2.

Figure 2:
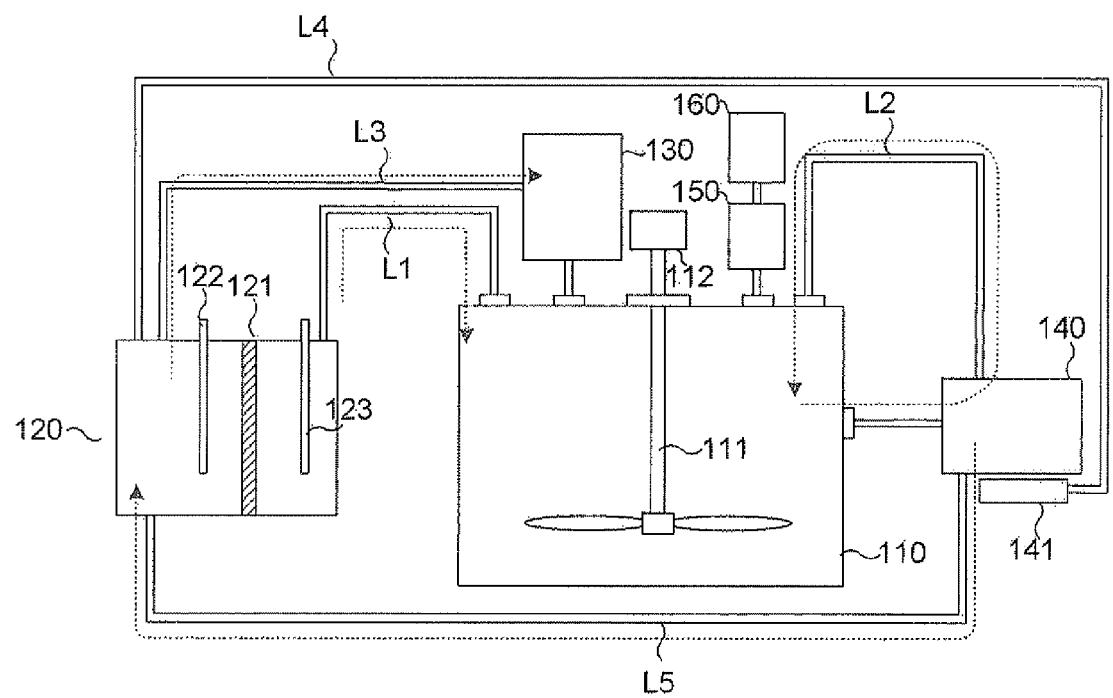
FIG. 2 is a schematic view showing the apparatus for dissolving noble metals in accordance with another embodiment of the present invention.

FIG. 2 is a schematic view showing the apparatus for dissolving noble metals according to another embodiment. In the apparatus as shown in FIG. 2, the electrolysis type chlorine producing unit 120, pH adjusting unit 130, dissolution reactor 110 and inorganic material extraction unit 140 are the same as described with reference to FIG. 1, and thus detailed descriptions thereof will be omitted hereinafter.

When the noble metal is a volatile one (Ru or Os), the apparatus for dissolving novel metals may further include a volatile noble metal collecting unit 150 for collecting and reducing noble metal oxides ($RuO_4$ or $OsO_4$) evaporated from the dissolution reactor 110, and an exhaust gas treating unit 160 for removing the chlorine compound contained in the gas discharged from the volatile noble metal collecting unit 150 and the dissolution reactor 110. Herein, the exhaust gas treating unit 160 may also be provided in the apparatus as shown in FIG. 1, when the noble metal to be dissolved is a non-volatile one.

When dissolving a non-volatile noble metal, the noble metal in the noble metal-containing sample is dissolved as a noble metal-chlorine complex by a specific oxidizing agent (chlorine compound), and the noble metal-chlorine complex is extract at the inorganic material extraction unit 140 in the form of a noble metal compound. However, when the noble metal to be dissolved is a volatile one, the noble metal is evaporated as an oxide phase ($RuO_4$ or $OsO_4$). Thus, the volatile metal collecting unit 150 may be provided to collect such volatile noble metals.

The volatile noble metal dissolved in the dissolution reactor 110 is introduced into the volatile metal collecting unit 150 in a gaseous form. The volatile noble metal collecting unit 150 may reduce the evaporated noble metal using a reducing agent, or a high concentration of strong acid solution containing an alcohol, in a manner known to those skilled in the art. The volatile noble metal oxide-containing gas may be reduced and separated by contacting it with the reducing agent or high concentration of strong acid solution containing an alcohol, particularly a high concentration of hydrochloric acid solution containing an alcohol.

To facilitate the reaction between the volatile noble metal-containing gas and the reducing agent or strong acid solution, an agitator may be provided in the volatile noble metal collecting unit 150. In addition, a diffuser may be provided in a line, through which the gas in the dissolution reactor 110 is transferred to the volatile noble metal collecting unit 150, at the end adjacent to the volatile noble metal collecting unit 150.

When dissolving a volatile noble metal, pure water is introduced into the dissolution reactor 110 by the pH adjusting unit 130, and the liquid inside the dissolution reactor 110 may be maintained at pH 1 to pH 14 by the alkali metal hydroxide of the pH adjusting unit 130. Particularly, the electrolyte includes an alkali metal chloride, and hydrogen gas produced at the cathode 122 as the counter reaction to the chlorine production is supplied to the heater 141 of the inorganic material extraction unit 140 as an energy source (e.g. supplementary heating source). At the same time, the alkali metal hydroxide produced at the cathode 122 is supplied to the pH adjusting unit 130, and the acidity of the liquid inside the dissolution reactor 110 may be controlled and maintained by the alkali metal hydroxide supplied from the electrolysis type chlorine producing unit 120.

The acidity of the liquid inside the dissolution reactor 110 is controlled to facilitate dissolution of the volatile noble metal, and the noble metal evaporated as an oxide phase is reduced in the volatile noble metal collecting unit 150. The liquid formed of pure water and acid evaporated from the inorganic material extraction unit 140 is supplied back to the dissolution reactor 110, while the solid alkali metal chloride extracted from the inorganic material extraction unit 140 is supplied to the electrolysis type chlorine producing unit 120 as an electrolyte.

Although it is shown in FIG. 2 that the solid alkali metal chloride extracted from the inorganic material extraction unit 140 is supplied to the electrolysis type chlorine producing unit 120 through a transfer line L5, the apparatus disclosed herein is not limited thereto, and the solid alkali metal chloride may be transferred in a batchwise manner to increase the transfer efficiency, if necessary.

After the dissolution of the noble metal, non-reacted chlorine compound may be discharged from the dissolution reactor 110 and the volatile noble metal collecting unit 150. To prevent emission of the non-reacted chlorine compound, the apparatus for dissolving novel metals may further include an exhaust gas treating unit 160. When the noble metal to be dissoluble is a volatile one as shown in FIG. 2, the exhaust gas treating unit 160 may be linked to the end of the volatile noble metal collecting unit 150 in order to remove the chlorine compound contained in the gas discharged from the volatile noble metal collecting unit 150.

The exhaust gas treating unit 160 intends to prevent emission of the non-reacted chlorine compound (oxidizing agent). The exhaust gas treating unit 160 may include a KI solution, $Fe^{2+}$ solution or a mixed solution containing inexpensive non-noble metals to remove the chlorine compound.

Although it is not shown in FIGS. 1 and 2, each of the apparatuses for dissolving novel metals may further include a heating unit provided on the outer wall of the dissolution reactor 110 for controlling the temperature of the dissolution reactor 110, and a pH sensor detecting pH of the liquid inside the dissolution reactor 110 in order to carry out more effective dissolution and evaporation of a noble metal. Each apparatus may further include a pump and a valve for transferring fluids (waste liquids and gases), if necessary. Herein, the output of the pH sensor is inputted into the pH adjusting unit 130 so that it functions as the standard by which introduction amounts of pure water, acid and base are controlled.

In addition, the apparatus disclosed herein may be designed by combining FIG. 1 with FIG. 2 so that both non-volatile noble metals and volatile noble metals may be applied thereto.

Examples 1-4 are carried out based on the apparatuses as shown in FIGS. 1 and 2. In Examples 1-4, pure noble metal particles are used as noble metal-containing samples.

Example 1

To a dissolution reactor, 1 g of Au powder with a size of 325 mesh or less and 100 mL of distilled water are introduced. Next, the liquid inside the dissolution reactor is controlled to and maintained at about pH 0.7 using hydrochloric acid provided in a pH adjusting unit. Then, a current of 0.3 A is applied to an electrolysis type chlorine producing unit containing 3 mol/L of NaCl to produce chlorine gas, which is supplied to the dissolution reactor. It is shown that the chlorine gas supplied from the electrolysis type chlorine producing unit is converted into $Cl_2(aq)$ in the dissolution reactor. After the dissolution reactor is agitated at 40° C. under 300 rpm for 5 hours, a gold solution with a concentration of 4000 ppm is obtained.

Example 2

Example 1 is repeated, except that 1 g of Pt powder with a size of 0.15-0.45 μm is used as a noble metal-containing sample, and a current of 0.4 A is applied to the electrolysis type chlorine producing unit. After the dissolution reactor is agitated at 40° C. under 300 rpm for 5 hours, a platinum solution with a concentration of 4000 ppm is obtained.

Example 3

To a dissolution reactor, 1 g of Ru powder with a size of about 200 mesh and 250 mL of distilled water are introduced. Next, a current of 0.6 A is applied to an electrolysis type chlorine producing unit containing 3 mol/L of NaCl to produce chlorine gas, which is supplied to the dissolution reactor. Then, the liquid inside the dissolution reactor is controlled to pH 12 using sodium hydroxide provided in a pH adjusting unit, and pH of the liquid is maintained at 3 or higher. At that time, it is shown that the chlorine gas supplied from the electrolysis type chlorine producing unit is converted into HCl, NaClO and OCl⁻ in the dissolution reactor. After the dissolution reactor is agitated at 40° C. under 300 rpm for 8 hours, a ruthenium solution with a concentration of 3300 ppm is obtained from a volatile noble metal collecting unit including a strong hydrochloric acid solution containing 20% ethyl alcohol.

Example 4

To a dissolution reactor, a mixture of 0.5 g of Pt powder with a size of 0.15-0.45 μm and 0.5 g of Ru powder with a size of about 200 mesh, and 150 mL of hydrochloric acid (2 mol/L) are introduced. The liquid inside the dissolution reactor is controlled to and maintained at about pH 0.7. Next, a current of 0.6 A is applied to an electrolysis type chlorine producing unit containing 3 mol/L of NaCl to produce chlorine gas, which is supplied to the dissolution reactor. At that time, it is shown that the chlorine gas supplied from the electrolysis type chlorine producing unit is converted into $Cl_2(aq)$ in the dissolution reactor. While the dissolution reactor is agitated at 40° C. under 300 rpm for 2 hours, hexachloroplatinic acid ($H_2PtCl_6$) is obtained in an inorganic material extraction unit from the dissolved platinum. After recovering the hexachloroplatinic acid from the inorganic material extraction unit, the liquid inside the dissolution reactor is controlled to an initial pH of 12 using sodium hydroxide provided in a pH adjusting unit, and then pH of the liquid is maintained at 3 or higher. Then, it is shown that the chlorine gas supplied from the electrolysis type chlorine producing unit is converted into HClO, NaClO and OCl⁻ in the dissolution reactor. After the dissolution reactor is agitated at 40° C. under 300 rpm for 5 hours, a ruthenium solution with a concentration of 1900 ppm is obtained from a volatile noble metal collecting unit including a strong hydrochloric acid solution containing 20% ethyl alcohol.

According to the apparatus disclosed herein, it is possible to provide the dissolution reactor with chlorine gas produced via electrolysis and having an amount capable of being controlled accurately by the amount of current applied depending on the particular type of a noble metal to be dissolved. It is also possible to convert the chlorine gas into a chlorine compound (oxidizing agent) adequate for the characteristics of the noble metal to be dissolved, and to allow the chlorine compound to react with the noble metal, thereby realizing a high noble metal dissolution rate, while allowing the chlorine source, chlorine and chlorine compound to form a closed system. Further, it is possible to recycle the acid, basic material and pure water for pH control, thereby realizing high dissolution efficiency and high safety.

While the exemplary embodiments have been shown and described, it will be understood by those skilled in the art that various changes in form and details may be made thereto without departing from the spirit and scope of this disclosure as defined by the appended claims. In addition, many modifications can be made to adapt a particular situation or material to the teachings of this disclosure without departing from the essential scope thereof.

Therefore, it is intended that this disclosure not be limited to the particular exemplary embodiments disclosed as the best mode contemplated for carrying out this disclosure, but that this disclosure will include all embodiments falling within the scope of the appended claims.

What is claimed is:

1. An apparatus for dissolving noble metals from a noble metal to be dissolved, selected from Au, Pt, Pd, Ru, Os or a combination thereof, which comprises:

a sealed dissolution reactor provided with agitators;

a sealed electrolysis chlorine producing unit connected with the dissolution reactor through a chlorine supplying line (L1), and supplying chlorine gas ($Cl_2$) produced via electrolysis to a liquid inside the dissolution reactor through the chlorine supplying line (L1);

a pH adjusting unit connected with the dissolution reactor through a line, and controlling and maintaining the pH of the liquid inside the dissolution reactor; and an inorganic material extraction unit connected with the dissolution reactor through a line, and extracting inorganic materials from the liquid received from the dissolution reactor via heating and evaporation;

wherein the pH adjusting unit controls the pH of the liquid inside the dissolution reactor in such a manner that at least one chlorine compound selected from a group consisting of $Cl_2(aq)$, $Cl_3^-$, HClO, $ClO^-$, NaClO, KClO and LiClO is produced, wherein the noble metal in a noble metal-containing sample introduced into the dissolution reactor is dissolved by the at least one chlorine compound, wherein the inorganic material extraction unit connected with the dissolution reactor through a liquid reintroduction line (L2), and the liquid evaporated from the inorganic material extraction unit is recycled to the dissolution reactor through the liquid reintroduction line (L2), wherein the electrolysis chlorine producing unit comprises an electrolyte containing a Cl-containing acid or alkali metal chloride, and an anode and a cathode separated by an ion exchange membrane, and the chlorine gas ($Cl_2$) produced at the anode is supplied to the dissolution reactor through the chlorine supplying line (L1), and wherein the sealed electrolysis chlorine producing unit connected with a heater through a hydrogen gas supply line (L4), and hydrogen gas ($H_2$) is produced at the cathode, and the hydrogen gas is supplied to the heater for the inorganic material extraction unit as a heating source through the hydrogen gas supply line.

2. The apparatus for dissolving noble metals according to claim 1, which further comprises a base supply line for an alkali metal hydroxide being supplied to the pH adjusting unit, wherein the alkali metal hydroxide is produced at the cathode, and wherein the electrolyte comprises an alkali metal chloride.

3. The apparatus for dissolving noble metals according to claim 1, which further comprises an exhaust gas treating unit for removing the at least one chlorine compound contained in the gas discharged from the dissolution reactor or the inorganic material extraction unit.

4. The apparatus for dissolving noble metals according to claim 1, wherein the noble metal is Ru, Os or a combination thereof, and the apparatus further comprises:

a volatile noble metal collecting unit for collecting and reducing an oxide of the volatile noble metal evaporated from the dissolution reactor; and an exhaust gas treating unit for removing the at least one chlorine compound contained in the gas discharged from the volatile noble metal collecting unit, wherein the inorganic material extracted from the inorganic material extraction unit is an alkali metal chloride, and the extracted alkali metal chloride is supplied to the electrolysis chlorine producing unit as an electrolyte.

* * * * *